United States Patent
Rieser

Patent Number: 5,829,142
Date of Patent: Nov. 3, 1998

[54] MOTORIZED TOOL HAVING ROTATABLY DRIVEN WORKPIECE ACCESSORIES

[76] Inventor: Timothy John Rieser, 27 Winding Brook Dr., Stratham, N.H. 03885

[21] Appl. No.: 696,524

[22] Filed: Aug. 14, 1996

[51] Int. Cl.⁶ .................................................. B23D 21/06
[52] U.S. Cl. .......................... 30/93; 30/95; 30/97; 7/150; 7/157
[58] Field of Search ....................... 7/150, 157; 30/93–97

[56] References Cited

U.S. PATENT DOCUMENTS

| | | | |
|---|---|---|---|
| D. 347,523 | 6/1994 | Villeneuve | D4/102 |
| 1,335,660 | 3/1920 | Conley | 30/96 |
| 1,374,663 | 4/1921 | Feldt . | |
| 1,677,922 | 7/1928 | Kasztler . | |
| 1,758,521 | 5/1930 | Kerrigan . | |
| 2,007,122 | 7/1935 | Briegel | 81/198 |
| 2,511,358 | 6/1950 | Mayer et al. | 30/102 |
| 2,515,627 | 7/1950 | Capewell | 30/102 |
| 2,563,483 | 8/1951 | O'Hagan | 30/123 |
| 3,355,749 | 12/1967 | Steffen | 7/14.1 |
| 3,449,992 | 6/1969 | Hanaway | 83/455 |
| 3,639,980 | 2/1972 | Muse et al. | 30/102 |
| 3,849,881 | 11/1974 | Strybel | 7/157 |
| 3,951,564 | 4/1976 | Montgomery | 408/29 |
| 4,224,737 | 9/1980 | Hart | 30/99 |
| 4,270,269 | 6/1981 | Weii et al. | 30/102 |
| 4,689,883 | 9/1987 | Dent | 30/94 |
| 4,831,732 | 5/1989 | Garton | 30/101 |
| 4,845,850 | 7/1989 | Rothenberger | 30/96 |
| 4,860,453 | 8/1989 | Carroll | 30/347 |
| 4,953,292 | 9/1990 | Tobey | 30/97 |
| 5,033,153 | 7/1991 | Post | 30/102 |
| 5,142,825 | 9/1992 | Floyd | 7/157 |
| 5,315,759 | 5/1994 | Mashata | 30/97 |
| 5,414,932 | 5/1995 | Azkona | 20/102 |
| 5,495,672 | 3/1996 | Kritchever et al. | 30/97 |

*Primary Examiner*—Maurina T. Rachuba
*Attorney, Agent, or Firm*—Bourque & Associates P.A.

[57] ABSTRACT

A motorized tool allows one or more operations to be performed on a workpiece, such as cutting and/or conditioning a surface of a pipe or a pipe fitting or receptacle. The motorized tool includes a cutter and/or one or more rotatably driven accessories, such as workpiece surface conditioners or brushes. The motorized tool further includes a drive mechanism used to rotate the workpiece against the cutter and to rotate the rotatably driven accessories. In one example, the drive mechanism rotates drive rollers that contact a workpiece and rotates the workpiece against a cutting element or edge of the cutter. In another example, the motorized tool includes an internal workpiece surface conditioner and an external workpiece surface conditioner that are also rotated by the drive mechanism to clean, debur or otherwise condition internal and external workpiece surfaces. The motorized tool can be hand-held or hand-operated and includes opposing pivotable members having handle portions. The cutter is disposed on one of the opposing members and the drive rollers are disposed on the other of the opposing members such that the workpiece is positioned between the opposing members in engagement with the drive rollers and cutting edge.

30 Claims, 5 Drawing Sheets

MOTORIZED TOOL HAVING ROTATABLY DRIVEN WORKPIECE ACCESSORIES

FIELD OF THE INVENTION

The present invention relates to motorized tools and in particular, to a hand-held and hand-operated motorized tool having a workpiece cutter and one or more rotatably driven accessories.

BACKGROUND OF THE INVENTION

Hand-held and hand-operated tools are used to perform various operations on workpieces, such as cutting, deburring, abrading or otherwise machining or conditioning a surface of a workpiece such as a pipe or pipe fitting. Typical pipe cutters, for example, include jaws having a cutter and workpiece support rollers that engage or clamp either side of a pipe, tubing or a similar workpiece. The pipe cutter is then manually revolved or rotated around the pipe while the cutter is manually forced against the pipe in order to cut through the pipe. Such pipe cutting tools require much physical exertion on the part of the operator and are often tedious and time consuming to use.

In addition to cutting a workpiece, other steps must often be performed to prepare the workpiece for the necessary applications. For example, both pipes and pipe fittings or receptacles, such as pipe joints or elbows, typically require additional conditioning of external or internal surfaces. The external surface of a pipe or similar workpiece which will be inserted in a workpiece receptacle and attached through bonding must often be conditioned by deburring and/or cleaning. The interior surface of the receptacle to which the pipe or workpiece is bonded must similarly be deburred and/or cleaned. These additional steps typically require a number of additional hand or power tools having the accessories needed to finish preparation of the external surface of a pipe and the interior surface of the pipe fitting or receptacle for the desired application. Using additional tools to perform these additional steps of preparation becomes even more tedious and time consuming.

Some manual pipe cutters have been provided with deburring or cleaning tools, such as brushes, as disclosed in U.S. Pat. No. 2,563,483; U.S. Pat. No. 3,355,749 and U.S. Pat. No. 1,758,521. These manual pipe cutting devices require that the pipe cutter be manually revolved around the pipe to perform the cutting and also require manually rotation around or within the pipe or pipe fitting to perform the deburring and/or cleaning. Existing pipe cutters are also limited with respect to the different types of conditioning that can be performed on a workpiece and in the types and sizes of workpieces.

Accordingly, what is needed is a motorized tool that easily and quickly cuts through a workpiece of various sizes. A motorized tool is also needed that provides for various rotatably driven accessories to allow internal and/or external workpiece surfaces to be easily and quickly conditioned. A motorized tool is also needed that can perform various operations on various types and sizes of workpieces including, but not limited to, pipes and pipe fittings or receptacles without requiring additional tools.

SUMMARY OF THE INVENTION

The present invention features a motorized tool for preparing a workpiece and comprises a cutter and/or one or more rotatably driven accessories. The present invention contemplates various embodiments of the motorized tool having various combinations of the cutter and/or rotatably driven accessories.

A first embodiment of the motorized tool comprises at least first and second opposing members pivotably coupled at a first end of each of the first and second members, for receiving and holding the workpiece therebetween. At least one cutter is disposed on the first opposing member, and a workpiece rotating mechanism is disposed proximate the second opposing member, for rotating the workpiece against the cutter.

The first and second opposing members preferably include at least first and second handle portions, respectively, for closing and holding the opposing members against the workpiece. The cutter is mounted on the first opposing member such that a cutting element of the cutter is disposed in a workpiece receiving region between the first and second opposing members. The cutter preferably includes a rotatable cutter having a cutting edge and is rotatably mounted on the first opposing member such that the cutting edge is disposed in the workpiece receiving region.

A drive mechanism is operatively coupled to the workpiece rotation mechanism for imparting rotation to the workpiece. One example of the workpiece rotating mechanism includes at least one drive roller, and preferably two drive rollers, rotatably mounted on the other of the opposing members. The drive roller(s) support and rotate the workpiece against the cutter. The drive mechanism preferably includes a rotation transfer mechanism, such as a gear train, operatively coupled to the drive roller(s), and includes a motor, operatively coupled to the rotation transfer mechanism, for providing rotation to the rotation transfer mechanism and drive roller(s). An actuation mechanism is operatively coupled between the motor and a power source for actuating the motor.

A second embodiment of the present invention features a motorized tool having a tool body portion; at least one cutter disposed on the tool body portion; a drive mechanism disposed in the tool body portion, for providing rotation to the workpiece; and at least one rotatably driven accessory disposed on the tool body portion and operatively coupled to the drive mechanism.

According to this second embodiment, the rotatably driven accessories include an external workpiece surface conditioner and/or an internal workpiece surface conditioner. The workpiece surface conditioners preferably include at least two different dimensions, for conditioning exterior and interior workpiece surfaces corresponding to two different dimensions. According to one embodiment, the rotatably driven accessory includes a rotatable brush.

A third embodiment of the present invention features a motorized tool comprising a tool body portion; at least one rotatably driven accessory disposed on the tool body portion, for operating on at least one surface of the workpiece; a drive mechanism disposed in the tool body portion and operatively coupled to the rotatably driven accessory; and at least one workpiece locking member disposed on the tool body portion proximate the rotatably driven accessory for locking a workpiece, such as a fitting or receptacle.

According to the preferred implementation of the third embodiment, the rotatably driven accessory includes a rotatable workpiece internal surface brush extending from a first side of the tool body portion and a rotatable workpiece external surface brush extending from a second side of the tool body portion.

Yet another embodiment of the present invention features a motorized tool comprising at least first and second opposing members pivotably coupled at a first end of the opposing members, for receiving the workpiece therebetween; at least one cutter disposed on the first opposing member; a workpiece rotating mechanism disposed proximate the second opposing member; a drive mechanism disposed in the second opposing member and operatively coupled to the workpiece rotating mechanism; and an internal workpiece surface conditioner and an external workpiece surface conditioner disposed on the second opposing member and operatively coupled to the drive mechanism.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1A:
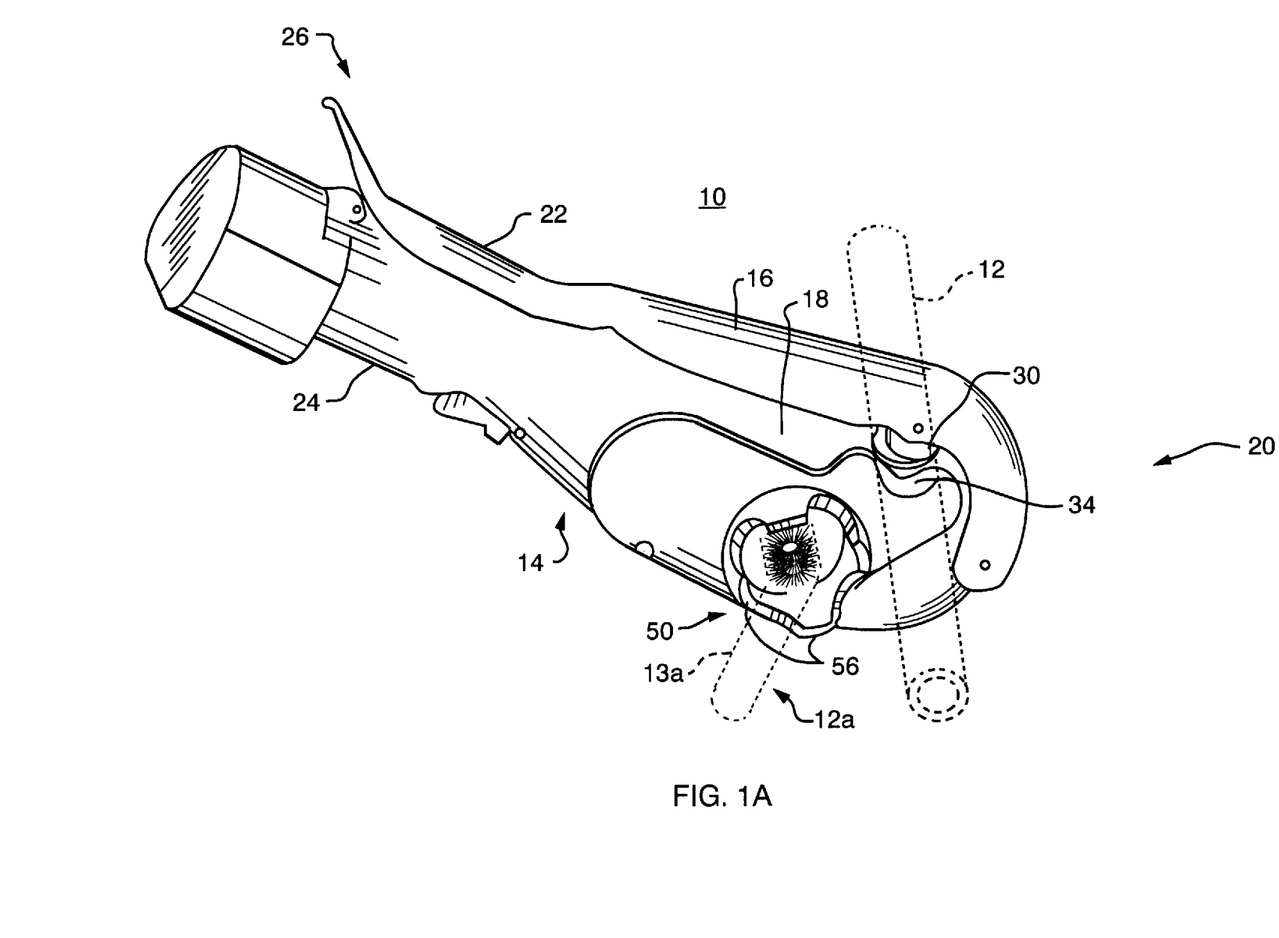
FIG. 1A is a top perspective view of a motorized tool, according to one embodiment of the present invention, having a cutter and rotatably driven accessories.
Figure 1B:
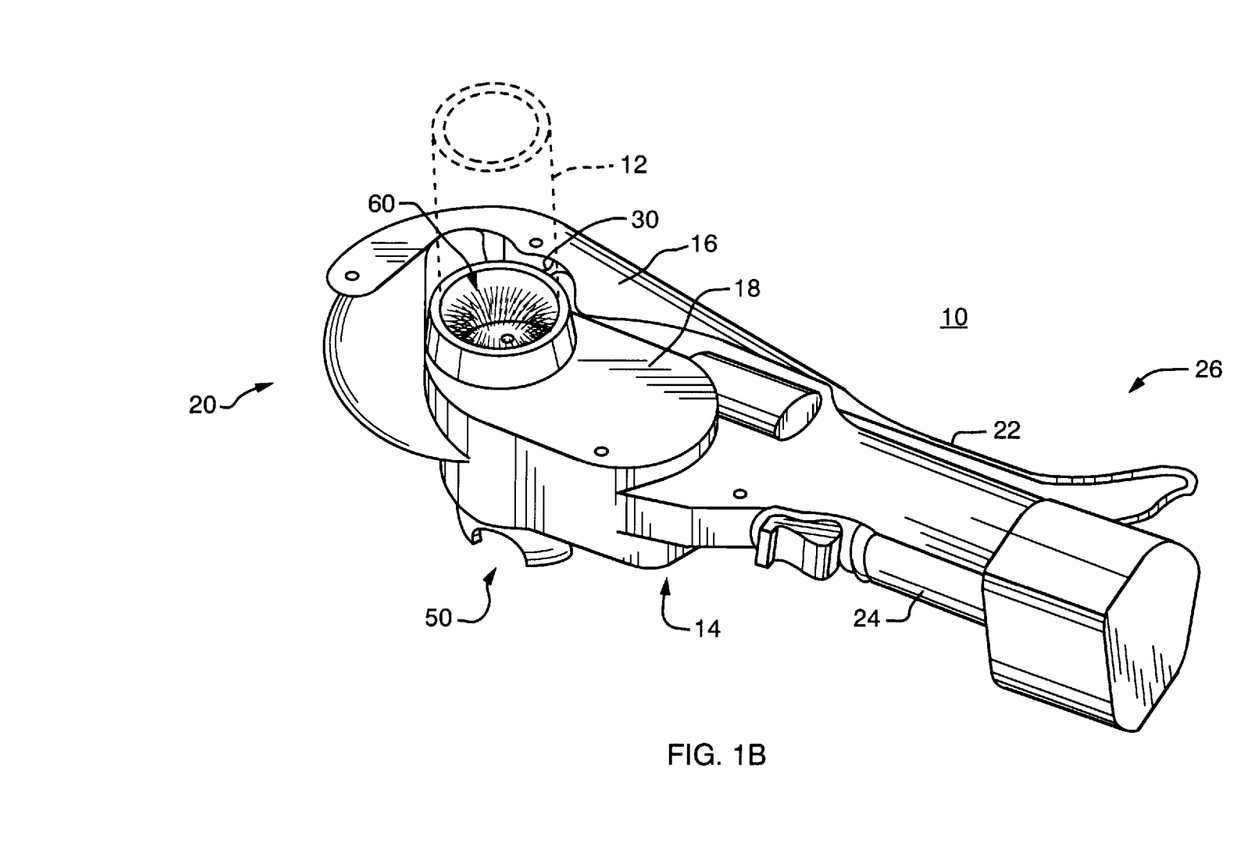
FIG. 1B is a bottom perspective view of the motorized tool, according to one embodiment of the present invention.

A motorized tool 10, FIGS. 1A and 1B, according to the present invention, is used to perform one or more various operations on a workpiece 12, such as cutting the workpiece 12 and/or cleaning, deburring, abrading, buffing, polishing or otherwise conditioning a surface of a workpiece 12a. According to the exemplary embodiment, the motorized tool 10 is hand-held or hand-operated and is used to cut and/or condition a pipe or tube 12 and also to condition a surface of a pipe fitting or receptacle 12a, such as a joint or elbow, for a desired application. The present invention also contemplates using the concepts and features of the present invention, as disclosed in greater detail below, with any type of motorized tool (whether or not hand-held) used to cut or condition any type of workpiece.

The motorized tool 10 includes a tool body portion 14 made, for example, of ABS plastic or any other suitable material. The tool body portion 14 preferably includes first and second opposing members 16, 18 pivotably coupled together proximate a first end 20 of the tool body 14. The preferred embodiment of the opposing members 16, 18 further includes first and second handle portions 22, 24, respectively, disposed proximate a second end 26 of the tool body portion 14. The handle portions 22, 24 allow the opposing members 16, 18 to be opened and closed when the workpiece 12 is received in the workpiece receiving region 34 between the opposing members 16, 18, for example, during cutting.

The motorized tool 10 includes a cutting mechanism 30 or one or more rotatably driven accessories 50, 60 (both shown in FIG. 1B) disposed on or in the tool body portion 14. The rotatably driven accessories 50, 60 include, but are not limited to, an internal workpiece surface conditioner 50 and external workpiece surface conditioner 60, such as internal and external wire brushes. The motorized tool 10 can include any one of these mechanisms or accessories alone or in combination with any other mechanism/accessory. The motorized tool 10 also preferably includes a drive mechanism (not shown) disposed generally within the tool body portion 14 to rotate the workpiece 12 against the cutting mechanism 30 and/or simultaneously rotate the one or more rotatably driven accessories 50, 60, as will be described in greater detail below.

Figure 2:
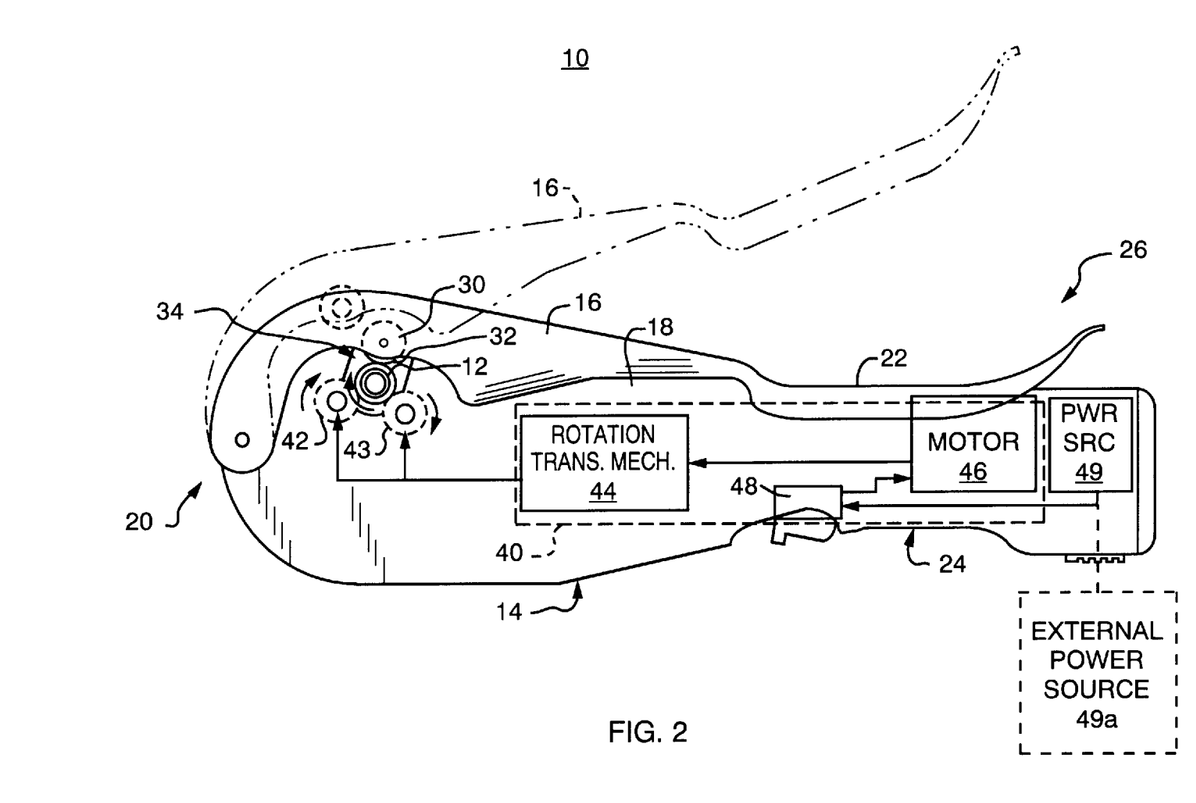
FIG. 2 is a side schematic view of the motorized tool and cutting mechanism according to one embodiment of the present invention.

According to one embodiment, the cutting mechanism 30, FIG. 2, is disposed on the first opposing member 16. The cutting mechanism 30 includes a cutting element or edge 32 that preferably extends into the workpiece receiving region 34 between the opposing members 16, 18 for engagement with the workpiece 12. One type of cutting mechanism 30 is a rotatable cutting wheel rotatably mounted on the first opposing member 16, such as those used in conventional pipe cutters.

The motorized tool 10 further includes a workpiece rotation mechanism disposed within the second opposing member 18, for rotating the workpiece 12 against the cutting edge 32 of the cutter 30. The workpiece rotation mechanism includes one or more drive rollers 42, 43 rotatably mounted within the second opposing member 18 and preferably made of a material such as urethane, rubber, metal, or any other suitable material, capable of imparting rotation to the workpiece 12. The preferred embodiment includes two drive rollers 42, 43 rotatably mounted within the second opposing member 18 such that each of the drive rollers 42, 43 extend into the workpiece receiving region 34 to contact, support and rotate the workpiece 12.

The workpiece rotation mechanism further includes a drive mechanism 40 operatively coupled to the drive rollers 42, 43, for imparting rotation to the drive rollers 42, 43, thereby rotating the workpiece 12 against the cutting edge 32. The drive mechanism 40 preferably includes a rotation transfer mechanism 44, such as a gear train, coupled to a motor 46 for providing the rotation to the drive rollers 42, 43. An actuation mechanism 48, such as a switch or button, is operatively coupled between the motor 46 and a power source 49, such as a battery, or an external power source 49a, to activate the motor 46 and begin the rotation of the workpiece 12.

In the exemplary use of the motorized tool 10 to cut a pipe, tube, or other substantially cylindrical workpiece 12, the workpiece 12 is positioned in the workpiece receiving region 34 between the opposing members 16, 18. The opposing members 16, 18 are then closed together, for example, by grasping the handle portions 22, 24, such that the workpiece 12 is supported by the drive rollers 42, 43 and the cutting edge 32 of the cutting mechanism 30 is positioned against a surface of the workpiece 12. The cylindrical workpiece 12 is then rotated with the drive rollers 42, 43 by depressing the switch or button 48, for example, thereby activating the motor 46. A continuous or increasing force is applied on the opposing members 16, 18 through the handle portions 22, 24 to cause the cutting edge 32 to cut through the workpiece 12. When the desired cutting operation has been completed, the rotation of the workpiece 12 is stopped by releasing the switch or button 48, and the opposing members 16, 18 are opened to allow the workpiece 12 to be removed.

Figure 3:
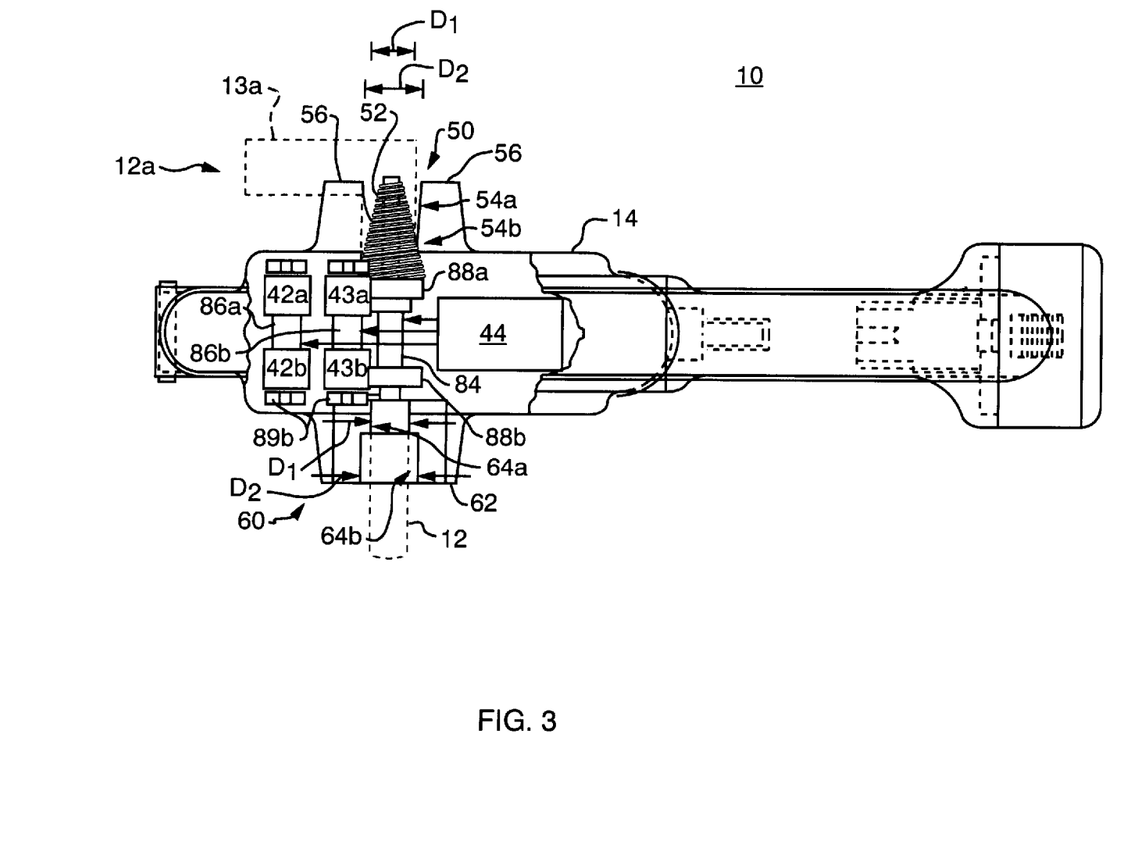
FIG. 3 is a top schematic view of the motorized tool and rotatably driven accessories according to one embodiment of the present invention.

According to the exemplary embodiment, the rotation transfer mechanism 44, FIG. 3, is also used to impart rotation to one or more rotatably driven accessories, such as an internal workpiece surface conditioner 50 and/or an external workpiece surface conditioner 60. One example of the internal workpiece surface conditioner 50 includes a brush 52 or similar element used to clean, debur or condition an internal surface of a workpiece, such as a joint, elbow or other type of fitting or receptacle. One example of the external workpiece surface conditioner 60 includes a brush 62 or similar element for cleaning, deburring or otherwise conditioning an external surface of a workpiece, such as a pipe or tube. The rotation transfer mechanism 44 preferably effectuates simultaneous rotation of one or all of the workpiece surface conditioners 50, 60 or other type of accessories.

Both the internal workpiece surface conditioner 50 and external workpiece surface conditioner 60 are preferably multiple stage conditioners capable of conditioning workpieces having different dimensions. For example, the internal surface conditioner or brush 52 includes at least first and second portions 54a, 54b having a range of different dimensions or diameters $D_1$, $D_2$ corresponding to a range of different internal dimensions or diameters of a workpiece, such as a pipe fitting. The external surface conditioner or brush 62 can include at least first and second external portions 64a, 64b having a range of different dimensions or diameters $D_1$, $D_2$ corresponding to different external dimensions or diameters of a workpiece such as a pipe. The multiple stages can be formed by a tapered configuration shown, for example, on the internal brush 52 or by a "stepped" configuration shown, for example, on the external brush 62.

One example of the internal and external brushes 52, 62 that can be used include wire brushes. Other types of accessories or workpiece surface conditioners that can also be used with the motorized tool 10 include sand paper, emery cloth, and other types of abrasive or surface conditioning materials.

According to one embodiment, one of the workpiece surface conditioners 50 can include a workpiece locking member, such as one or more locking tabs 56 disposed on the tool body portion 14. According to the preferred embodiment, the locking tabs 56 lock a pipe joint, elbow or other similarly shaped workpiece 12a having a portion 13a that extends between the locking tabs 56 to lock the workpiece 12a and prevent rotation of the workpiece during conditioning using a rotatable workpiece surface conditioner, such as an internal brush 52.

In one example, the rotatably driven accessories 50, 60 are coupled to an accessory shaft 84 rotatably mounted in one or more bearings 88a, 88b to support and facilitate rotation of the accessory shaft 84 and the one or more rotatably driven accessories 50, 60. The internal or external brushes 52, 62 or other types of accessories are preferably removably coupled to the accessory shaft 84. Various accessories, such as various types of workpiece surface conditioners, can be interchangeably coupled to the motorized tool 10, depending upon the desired operations to be performed on the workpiece. One way of removably coupling the internal or external surface brushes 52, 62 is by threadably engaging one end of the internal or external brush 52, 62 within an internally threaded region of the accessory shaft 84. The present invention also contemplates a square or hex-shaped end of the accessory that engages and locks with a matching region in the shaft 84 according to conventional methods.

In one example, each drive roller 42, 43 includes two drive roller portions 42a, 42b and 43a, 43b mounted on a drive roller shaft 86a, 86b. Each drive roller shaft 86a, 86b is preferably mounted in one or more bearings 89a, 89b respectively to support the drive roller shafts 86a, 86b and facilitate rotation of the drive rollers 42, 43.

Figure 4:
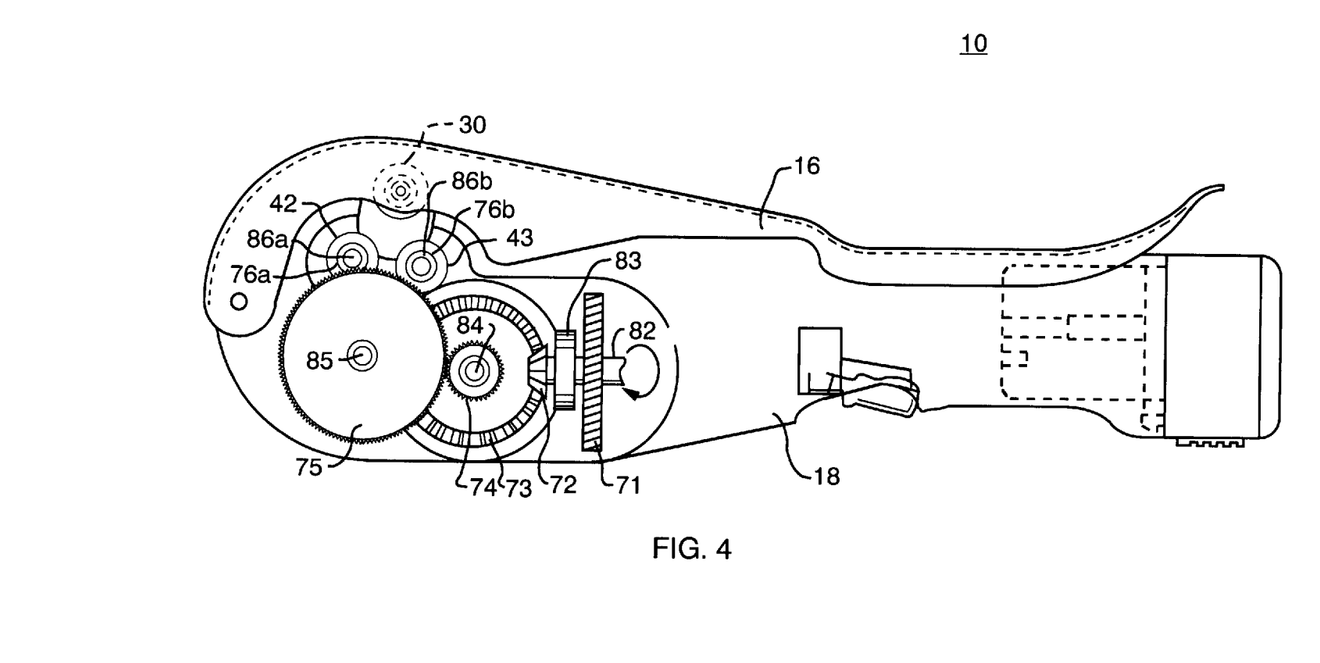
FIG. 4 is a side view of a motorized tool having a drive mechanism according to one embodiment of the present invention.

According to one embodiment, the rotation transfer mechanism 44, FIG. 4, includes a gear train having a series of gears 71–75 that transfer rotation from the motor 46 to the drive rollers 42, 43.

One example of the gear train includes a drive gear 71 mounted on a drive shaft 82. The drive gear 71 is driven by the motor 46 through additional gears or directly. A bevel gear 72 is also mounted on the drive shaft 82. The drive gear 71 and bevel gear 72 are mounted on the drive shaft 82, for example, using retaining rings. A drive bearing 83 can also be provided on the drive shaft 82 to support the drive shaft 82 and facilitate rotation.

An accessory slave gear 73 is mounted on the accessory shaft 84 and engages with the beveled gear 72 mounted on the drive shaft 82 to impart rotation from the drive shaft 82 to the accessory shaft 84. The accessory shaft 84 provides rotation to any accessories used on the motorized tool 10, such as internal or external workpiece surface conditioners. A roller drive gear 74 is also mounted on the accessory shaft 84 and engages with a transfer gear 75 mounted on a transfer gear shaft 85. The transfer gear 75 engages with roller shaft slave gears 76a, 76b mounted on roller shafts 86a, 86b. The transfer gear 75 thereby transfers rotation from the accessory shaft 84 to the roller shafts 86a, 86b and thereby rotates the drive rollers 42, 43.

The present invention also contemplates any other gear train or rotation transfer mechanism capable of transferring rotation from the motor 46 to the drive rollers 42, 43. The gears used according to one example include standard stainless steel gears known to those skilled in the art. The gears are typically mounted on the shafts using retaining rings and gear pin assemblies known to those skilled in the art. The drive shaft 82, accessory shaft 84, transfer gear shaft 85 and roller shafts 86a, 86b according to this example are also made of stainless steel.

One application of the motorized tool 10 according to the present invention is to cut a pipe or tube and clean or debur the external surfaces of the pipe at the end of the cut pipe and to clean or debur the internal surfaces of a pipe fitting or receptacle. The pipe is placed in the motorized tool 10 against the one or more drive rollers 42, 43. The first opposing member 16 having the cutting mechanism 30 is closed against the pipe so that the cutting edge 32 engages the outer surface of the pipe. The rotation of the drive rollers 42, 43 and the pipe is begun, for example, by activating the button 48. The opposing members 16, 18 are forced together by grasping the handle portions 22, 24 of the opposing pivotable members 16, 18, thereby causing the cutting edge 32 to cut through the pipe.

Upon cutting the pipe, the pieces of pipe are removed. The external surface of the pipe is cleaned or deburred by positioning an end of the pipe within the external brush 62. The external brush 62 is then rotated by activating the button or switch 48 until the external surface of the pipe is sufficiently cleaned or deburred. The internal surface of a pipe fitting or receptacle is cleaned or deburred by positioning the pipe fitting or receptacle over the internal brush 52 and locking a portion 13a of the pipe fitting 12a between the locking tabs 56. The internal brush 52 is then rotated by activating the button or switch 48 until the surface is sufficiently cleaned or deburred. The pipe and pipe fitting can then be coupled and bonded together for use.

The present invention also contemplates other applications of the motorized tool to cut, grind, chamfer, debur, buff, polish, or otherwise machine or condition a surface of any type of workpiece.

Accordingly, the motorized tool of the present invention allows a number of different operations to be relatively quickly and easily performed on a workpiece, such as a pipe, tube, elbow or joint without requiring a number of additional tools. The motorized tool provides a workpiece rotation mechanism that facilitates cutting of a workpiece by rotating the workpiece against the cutting mechanism. The motorized tool also includes one or more additional accessories that can be rotated using the same drive mechanism that drives the workpiece rotation mechanism. The motorized tool can be hand held or hand operated and allows a number of different operations to be performed on a workpiece without requiring excessive manipulation of the tool and/or the workpiece.

Modifications and substitutions by one of ordinary skill in the art are considered to be within the scope of the present invention which is not to be limited except by the claims which follow.

What is claimed is:

1. A motorized tool, for cutting a workpiece, said motorized tool comprising:
    at least first and second opposing members pivotably coupled proximate a first end of each of said first and second members, for receiving the workpiece therebetween;
    at least one cutter disposed on one of said at least first and second opposing members; and
    a workpiece rotating mechanism, disposed proximate an other of said at least first and second opposing members, for rotating the workpiece against said at least one cutter.

2. The motorized tool of claim 1, wherein said at least first and second opposing members include at least first and second handle portions, respectively, for closing said at least first and second opposing members against the workpiece.

3. The motorized tool of claim 1, wherein said at least one cutter includes a cutting element, and wherein said cutter is mounted on said one of said at least first and second opposing members such that said at least one cutting element is disposed in a workpiece receiving region between said at least first and second workpiece opposing members.

4. The motorized tool of claim 3, wherein said at least one cutter includes a rotatable cutter having a cutting edge, and wherein said rotatable cutter is rotatably mounted on said one of said at least first and second opposing members such that said cutting edge is disposed in said workpiece receiving region between said at least first and second workpiece opposing members.

5. The motorized tool of claim 1, wherein said workpiece rotating mechanism includes at least one drive roller, rotatably mounted on said other of said at least first and second opposing members, for supporting and rotating the workpiece against said at least one cutter.

6. The motorized tool of claim 5, further including a drive mechanism, operatively coupled to said at least one drive roller, for rotating said at least one drive roller.

7. The motorized tool of claim 6, wherein said drive mechanism includes:
    a rotation transfer mechanism operatively coupled to said at least one drive roller; and
    a motor, operatively coupled to said rotation transfer mechanism, for providing rotation to said rotation transfer mechanism and said at least one drive roller.

8. The motorized tool of claim 7, further including an actuation mechanism, operatively coupled between said motor and a power source, for actuating said motor.

9. The motorized tool of claim 6, wherein said rotation transfer mechanism includes a gear train.

10. The motorized tool of claim 1, wherein said workpiece rotating mechanism includes at least two drive rollers, rotatably mounted on said other of said at least first and second opposing members, for rotating and supporting the workpiece against said at least one cutter.

11. The motorized tool of claim 1, further including at least one rotatably driven accessory disposed on at least one of said at least first and second opposing members.

12. The motorized tool of claim 11, wherein said at least one rotatably driven accessory includes an external workpiece surface conditioner, for conditioning an external surface of the workpiece.

13. The motorized tool of claim 11, wherein said at least one rotatably driven accessory includes an internal workpiece surface conditioner, for conditioning an internal surface of the workpiece.

14. The motorized tool of claim 11, wherein said at least one rotatably driven accessory is disposed on said other of said at least first and second opposing members and is operatively coupled to said rotation transfer mechanism, for rotating said at least one rotatably driven accessory.

15. A motorized tool, for preparing a workpiece, said motorized tool comprising:
    a tool body portion;
    at least one cutter disposed on said tool body portion;
    a drive mechanism disposed in said tool body portion, for providing rotation to the workpiece;
    at least two drive rollers rotatably mounted on said tool body portion and operatively coupled to said drive mechanism, for rotating and supporting the workpiece at two points along a circumference of said workpiece during cutting; and
    at least one rotatably driven accessory disposed on said tool body portion, wherein said at least one rotatably driven accessory is operatively coupled to said drive mechanism, for rotating said at least one rotatably driven accessory against a surface of the workpiece.

16. The motorized tool of claim 15, wherein said at least one rotatably driven accessory includes an external workpiece surface conditioner, for rotating around the workpiece and conditioning an external surface of the workpiece.

17. The motorized tool of claim 15, wherein said at least one rotatably driven accessory includes an internal workpiece surface conditioner, for rotating within the workpiece and conditioning an internal surface of the workpiece.

18. The motorized tool of claim 15, wherein said at least one rotatably driven accessory includes a workpiece surface conditioner having at least two different dimensions, for conditioning workpiece surfaces corresponding to said at least two different dimensions.

19. The motorized tool of claim 15, further including at least one workpiece locking member disposed on said tool body portion proximate said at least one rotatably driven accessory, for locking the workpiece while using said at least one rotatably driven accessory.

20. The motorized tool of claim 15, further including at least one switch disposed on said tool body portion, and operatively coupled between a power source and said drive mechanism, for activating said drive mechanism.

21. The motorized tool of claim 15, wherein said at least one rotatably driven accessory includes a rotatable brush.

22. The motorized tool of claim 15 wherein said tool body portion includes first and second opposing members pivotably coupled proximate one end of each of said first and second members, for receiving the workpiece therebetween, wherein said cutter is rotatably disposed on said first opposing member, wherein said drive rollers are disposed in said second opposing member opposite said cutter, and wherein said first and second opposing members include first and second handle portions, respectively, for applying said cutter against the workpiece supported on said drive rollers.

23. A motorized tool, for preparing a workpiece, said motorized tool comprising:
   a tool body portion;
   at least one cutter disposed on said tool body portion, for cutting the workpiece;
   at least one rotatably driven accessory disposed on said tool body portion, for operating on at least one surface of the workpiece;
   a drive mechanism disposed in said tool body portion and operatively coupled to said at least one rotatably driven accessory, for imparting rotation to said at least one rotatably driven accessory;
   at least one drive roller, disposed opposite said at least one cutter and operatively coupled to said drive mechanism, for rotating the workpiece against said at least one cutter;
   at least one workpiece locking member disposed on said tool body portion proximate said at least one rotatably driven accessory, for locking the workpiece as said at least one rotatably driven accessory is rotated against said workpiece.

24. The motorized tool of claim 23, wherein said at least one rotatably driven accessory includes an internal workpiece surface conditioner.

25. The motorized tool of claim 23, wherein said at least one rotatably driven accessory includes an external workpiece surface conditioner.

26. The motorized tool of claim 23, wherein said at least one rotatably driven accessory includes an internal brush extending from a first side of said tool body portion and an external brush extending from a second side of said tool body portion.

27. The motorized tool of claim 23, wherein said at least one rotatably driven accessory includes a workpiece surface conditioner having at least two different dimensions, for conditioning workpiece surfaces corresponding to said at least two different dimensions.

28. The motorized tool of claim 23 wherein said at least one drive roller includes two drive rollers, rotatably mounted on said tool body portion opposite said cutter, for rotating and supporting the workpiece against said cutter.

29. A motorized tool, for preparing a workpiece, said motorized tool comprising:
   at least first and second opposing members pivotably coupled at a first end of each of said first and second opposing members, for receiving the workpiece therebetween;
   at least one cutter disposed on said first opposing member;
   a workpiece rotating mechanism disposed on said second opposing member, for rotating the workpiece against said at least one cutter;
   a drive mechanism, disposed in said second opposing member and operatively coupled to said workpiece rotating mechanism, for providing rotation to said workpiece rotating mechanism;
   an internal workpiece surface conditioner disposed on said second opposing member and operatively coupled to said drive mechanism; and
   an external workpiece surface conditioner disposed on said second opposing member and operatively coupled to said drive mechanism.

30. The motorized tool of claim 29 wherein said workpiece rotating mechanism includes at least two drive rollers, rotatably mounted on said second opposing member, for rotating and supporting the workpiece against said cutter.

* * * * *